United States Patent
Caracciolo et al.

(10) Patent No.: US 7,567,589 B2
(45) Date of Patent: Jul. 28, 2009

(54) RATE GENERATOR IN A VIDEO ON DEMAND SYSTEM HAVING MULTIPLE CONSTANT BIT RATE DATA

(75) Inventors: Gerald T. Caracciolo, Cherry Hill, NJ (US); Steven Zack, Burlington, NJ (US)

(73) Assignee: Comcast IP Holdings I, LLC., Wilmington, DE (US)

( * ) Notice: Subject to any disclaimer, the term of this patent is extended or adjusted under 35 U.S.C. 154(b) by 256 days.

(21) Appl. No.: 11/585,482

(22) Filed: Oct. 24, 2006

(65) Prior Publication Data

US 2007/0091936 A1   Apr. 26, 2007

Related U.S. Application Data

(62) Division of application No. 09/459,237, filed on Dec. 10, 1999, now Pat. No. 7,142,567.

(60) Provisional application No. 60/127,395, filed on Apr. 1, 1999.

(51) Int. Cl.
   *H04J 3/06* (2006.01)
(52) U.S. Cl. ...... 370/516; 370/252
(58) Field of Classification Search ........... 370/516, 370/517, 518, 252; 725/87, 101
   See application file for complete search history.

(56) References Cited

U.S. PATENT DOCUMENTS

| | | | |
|---|---|---|---|
| 4,761,587 A | 8/1988 | Wharton | |
| 5,481,542 A | 1/1996 | Logston et al. | |
| 5,710,593 A * | 1/1998 | Reynolds | 348/181 |
| 5,732,106 A * | 3/1998 | Rasmussen et al. | 375/296 |
| 5,796,838 A * | 8/1998 | Heerman | 380/38 |
| 5,913,026 A | 6/1999 | Bleidt et al. | |
| 5,956,376 A * | 9/1999 | Nakaya et al. | 375/340 |
| 6,256,070 B1 | 7/2001 | Frank | |
| 6,389,040 B1 | 5/2002 | Viswanathan | |
| 6,497,804 B1 * | 12/2002 | Gorfinkel et al. | 204/603 |
| 6,563,895 B2 * | 5/2003 | Patel et al. | 375/355 |
| 6,574,204 B1 * | 6/2003 | Lee | 370/335 |

* cited by examiner

*Primary Examiner*—Ricky Ngo
*Assistant Examiner*—Christine Ng
(74) *Attorney, Agent, or Firm*—Banner & Witcoff, Ltd.

(57) ABSTRACT

A rate generator for generating a plurality of different frequencies that represent video requests in a video on demand (VOD) system. The rate generator comprises a plurality of parallel groups, each group comprising a phase accumulator module having a plurality of phase accumulators, a phase increment model having a plurality of phase increment registers, and an adder, coupled to the phase accumulator module and the phase increment module. The adder sums the phase increment value from the phase from the phase increment module and the output of the phase accumulator module and provides the value back to the phase accumulator module. When the sum reaches a pre-determined value, the adder resets and generates a pulse at a frequency dependent on the phase increment and the sampling frequency. In addition, a method for deriving the rate generator architecture is also provided.

19 Claims, 4 Drawing Sheets

100

300

RATE GENERATOR IN A VIDEO ON DEMAND SYSTEM HAVING MULTIPLE CONSTANT BIT RATE DATA

CROSS-REFERENCE TO RELATED APPLICATION

This application is a divisional of U.S. patent application Ser. No. 09/459,237 filed Dec. 10, 1999 now U.S. Pat No. 7,142,567 which application claims benefit of U.S. Provisional Patent Application Ser. No. 60/127,395 filed Apr. 1, 1999; both prior applications are incorporated herein by reference in their entireties.

BACKGROUND OF THE INVENTION

1. Field of the Invention

The invention relates to frequency generators. More particularly, the invention relates to an apparatus and a method for generating multiple video requests in a video on demand (VOD) system at many possible frequencies.

2. Description of the Background Art

Video on demand (VOD) systems typically provide requested content to subscribers via a communication channel having a constant bit rate. Different types of content require greater or lesser amounts of data to provide adequate presentation of the content to a user. For example, a sporting event such as an automobile race requires a relatively high bit rate, while a presentation of nineteenth century paintings will require a comparatively lower bit rate.

Current VOD systems stream data to users in response to data requests. These data requests are limited to a few standardized rates, which are generally integer multiples of each other. Although the VOD system may assign one of these standardized data rates to one of the data streams, such an application fails to generate the highly accurate requests required to avoid data overflow or starvation problems at the end user. As such, VOD systems must carefully match requested video data to the available constant bit rates.

Therefore, there is a need for providing a VOD system that is capable of increasing the number of frequencies over the current approach.

SUMMARY OF THE INVENTION

The invention overcomes the disadvantages of the prior art by providing a rate generator and a concomitant method for generating many possible frequencies in a video on demand (VOD) system. Specifically, the rate generator comprises a plurality of parallel oscillator modules. Each oscillator module comprises a phase accumulator, a phase increment register and an adder. The adder is coupled to the phase accumulator and the phase increment register, where the register is coupled to a first input of the adder while the accumulator is coupled to the output of the adder and a second input of the adder. As such, the register contents sets the frequency for the oscillator, the accumulator accumulates the adder output (phase accumulation) and feeds the accumulated phase into the second input of the adder. The adder periodically adds a phase increment value, stored within the phase increment register, to the current value in the phase accumulator. When the sum in the phase accumulator reaches a pre-determined value, e.g., a roll over occurs, the adder generates a pulse at the carry out port having a frequency that is dependent on the phase increment value and the sampling frequency. As such, the carry out signal from the adder forms a digital clock output of the oscillator.

To form a plurality of clock signals having different and unrelated frequencies, the oscillator components (adder, register and accumulator) are time shared such that for each instant of time, the oscillator is computing a different output frequency based upon a different set of register and accumulator values. The values used in each individual oscillator are stored in a dual port memory for rapid and repeated access by the module.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is described within the context of a video on demand (VOD) system. Such a system is disclosed in U.S. patent application Ser. No. 08/984,710, filed Dec. 3, 1997, and herein incorporated by reference in its entirety. The video information supplied by the VOD system is typically formatted in accordance with the MPEG (Moving Pictures Experts Group) standards, such as ISO/IEC 11172 (MPEG-1) and ISO/IEC 13818 (MPEG-2), both of which are incorporated by reference in their entireties. However, it will be appreciated by those skilled in the art that the teachings of this disclosure may be readily applied to other non-VOD systems, and to systems utilizing other standards for conveying information to a plurality of users. Such other standards include the American Television Standards Committee (ATSC) and European Digital Video Broadcasting (DVB) digital television and communication related standards.

Figure 4:
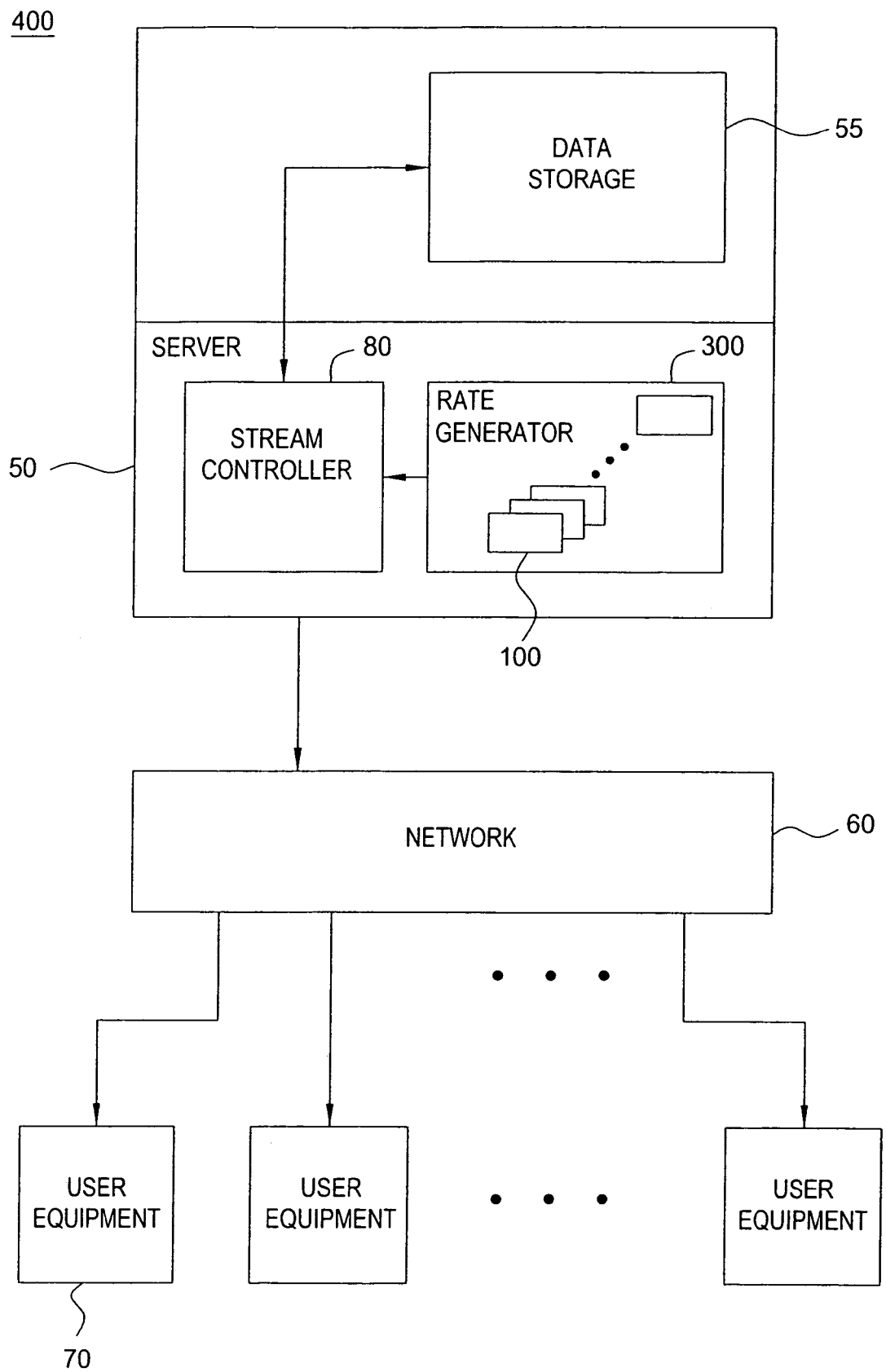
FIG. 4 depicts a top level block diagram of a video on demand (VOD) system.

FIG. 4 depicts a top-level block diagram of the VOD system that provides or serves video content at different constant bit rates, i.e., Multiple Constant Bit Rate (MCBR). This capability of serving or providing MCBR content enables the VOD system 400 to provide a greater variety of video content with different resolutions or compression rates. As such, the VOD system 400 is not limited to serving video content of a single resolution or video quality.

The VOD system 400 comprises a server 50, a network 60 and user equipment 70. The server 50 transmits video content to a plurality of user equipment 70 via the network 60. More specifically, the server 50 comprises data storage 55, a stream controller 80 and a rate generator 300. The rate generator 300 produces a plurality of clock signals. These clock signals are used by the stream controller to access data streams from the data storage 55 and combine multiple constant bit rate (MCBR) data into a transport stream. The stream controller 80 provides the data stream to the network 60 and user equipment 70.

The VOD system 400 provides a variety of video content at "arbitrary" bit rates that are not necessarily multiples of a default frequency. As such, the inventive concept is embodied in the generation of clock signals at different rates that are arbitrarily related, i.e. not related to each other by a default or base frequency. These clock signals facilitate retrieval and processing of the MCBR data into a transport stream. The multiple frequency rate generator allows the stream controller 80 to provide MCBR video content to a plurality of end users at arbitrarily related rates.

More specifically, the rate generator 300 comprises a plurality of oscillators 100 to provide clock pulses required for generating a transport stream comprising MCBR data. Theoretically, each end user could request a different bit rate stream such that, one oscillator 100 is required for each end user. To facilitate creating a plurality of clock signals without a plurality of clock circuits, a rate generator 300 comprises a small number of oscillator component circuits and uses the oscillator components in a sequential, time-shared or time division multiplexed (TDM) manner. In this manner, very few physical components can be used to produce a plurality of clock signals, i.e., the rate controller contains a plurality of virtual oscillators.

Figure 1:
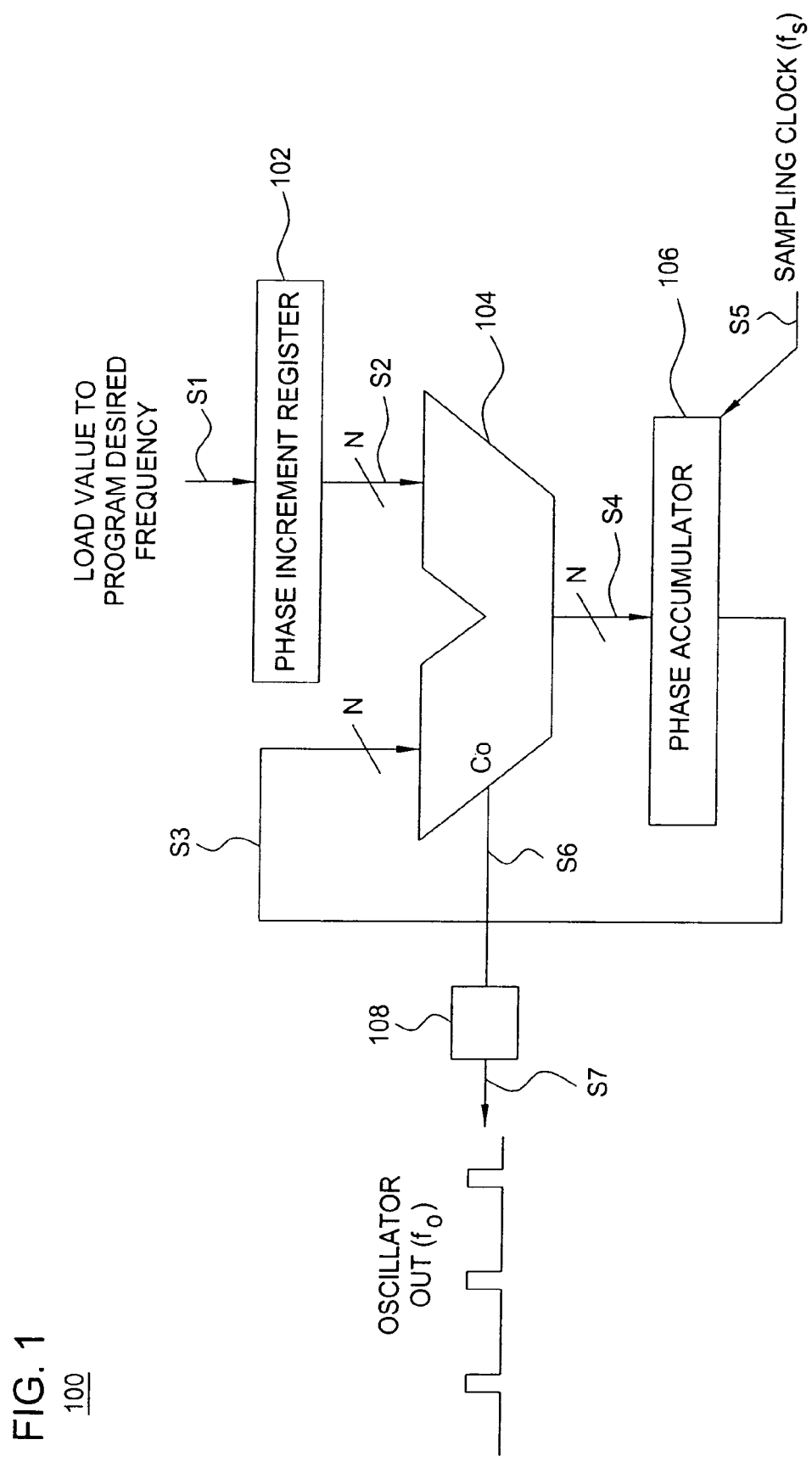
FIG. 1 depicts a block diagram of an oscillator.

FIG. 1 depicts a block diagram of an oscillator 100 for controlling data output in the VOD system 400 of FIG. 4. The oscillator 100 of FIG. 1 generates pulses at particular frequencies or time intervals using a direct digital synthesis (DDS) technique. The oscillator 100 comprises a phase increment register 102, a phase adder 104, and a phase accumulator 106. The oscillator 100 may also include a register 108 at the carry out (Co) port of the phase adder 106.

The oscillator 100 receives an arbitrary value (k) and generates a pulse at an output frequency ($f_o$) that is related to the value k by the equation:

$$f_o = \frac{k \times f_s}{2^N} = \text{where:}$$

k=phase increment (an integer value)
$f_s$=sampling clock frequency
N=number of accumulator bits The output frequency $f_o$ is defined in terms of a resolution. The resolution is the lowest possible frequency that the oscillator 100 may generate. As such, the resolution is equal to the output frequency when k=1:

$$\text{resolution} = \frac{f_s}{2^N} \quad \text{such that} \quad f_o = k \times \text{resolution}$$

In operation, the phase increment register 102 receives from memory a phase increment value k via signal path S1. Phase increment k is generally an integer between 1 and $2^{N-1}$, where N is the number of accumulator bits (i.e., the number of bits capable of being stored in the phase accumulator 106). As such, the phase increment register 102 is typically an N-bit register that receives and stores an N-bit binary number. The phase increment register 102 operates as a buffer and provides the preloaded phase increment value k when needed. The output of the phase increment register 102 is coupled to the phase adder 104 via signal path S2.

The phase adder 104 receives the phase increment k from the phase increment register 102 via signal path S2 and the output from the phase accumulator 106 via signal path S3. The phase adder 104 adds the phase increment and phase accumulator outputs, which are both N-bit binary numbers, and couples the sum to the phase accumulator 106 via signal path S4.

The phase accumulator 106 comprises an N-bit register that receives the sum from the phase adder 104 via signal path S4 and provides this sum back to the phase adder 104 via signal path S3 during each periodic time interval, as defined by the sampling frequency $f_s$. Upon receiving a pulse from a sampling clock having a frequency $f_s$ via signal path S5 and during each frequency cycle, the phase accumulator 106 provides the updated sum back to the phase adder 104.

The phase adder 104 utilizes modulo $2^N$ addition. As such, when the sum of the phase adder 104 exceeds $2^N-1$ (there are $2^N$ binary numbers ranging from 0 to $2^N-1$), the phase adder 104 "rolls over" through zero and starts again. When the phase adder 104 rolls over, the phase adder 104 generates a carry out signal (denoted as Co in FIG. 1) at the carry out port, which generally comprises a pulse, via signal path S6. The phase adder 104 generates the pulse at an output frequency $f_o$ that is dependent upon the phase increment, the sampling frequency and the number of accumulator bits. As such, the oscillator 100 may generate pulses at many possible frequencies that are arbitrary related or "arbitrary," i.e. not integer multiples of one another.

The actual output frequency, $f_o$, represents an average frequency, since the modulo $2^N$ value (remainder) is often a non-zero number when the phase adder 104 rolls over. Unless k is a power of two, the remainder or value after roll over may introduce a phase jitter that increases with the value of k, since there are less samples per period or frequency cycle.

As an illustrative example, assume that phase accumulator 106 utilizes three bits (N=3) and that the phase increment is three (k=3). Also, assume that the phase accumulator 106 does not have any initial offset. In this case, the average output frequency $f_o$ is 0.375 of the sampling frequency, which means that the output pulse occurs once every 2.67 iterations of the sampling pulse. During the first two sampling cycles, the sum of the phase adder is three and six, respectively. In the third sampling cycle, the phase adder 104 rolls over with a remainder of two. Hence, the output frequency is only one third of the sampling frequency at the first roll over of the phase adder 104. However, this effect will even out with subsequent iterations of the phase adder 104.

The oscillator 100 may also include a register 108 for temporarily storing the carry out pulse from the phase adder 104. The register 108 receives the pulse from the carry out of the phase adder 104 via signal path S6 and sends this pulse via signal path S7 when needed. As the pulse is usually a single bit signal, the register 108 may comprise a single-bit register.

The invention produces a plurality of clock signals from an oscillator like the one in FIG. 1 by time sharing the components of the oscillator. Such time sharing of the components forms a rate generator comprising a plurality of virtual oscillators, where the implementation of the rate generator requires certain operational parameters to be fulfilled. These parameters for the rate generator can be defined using a particular method.

Figure 2:
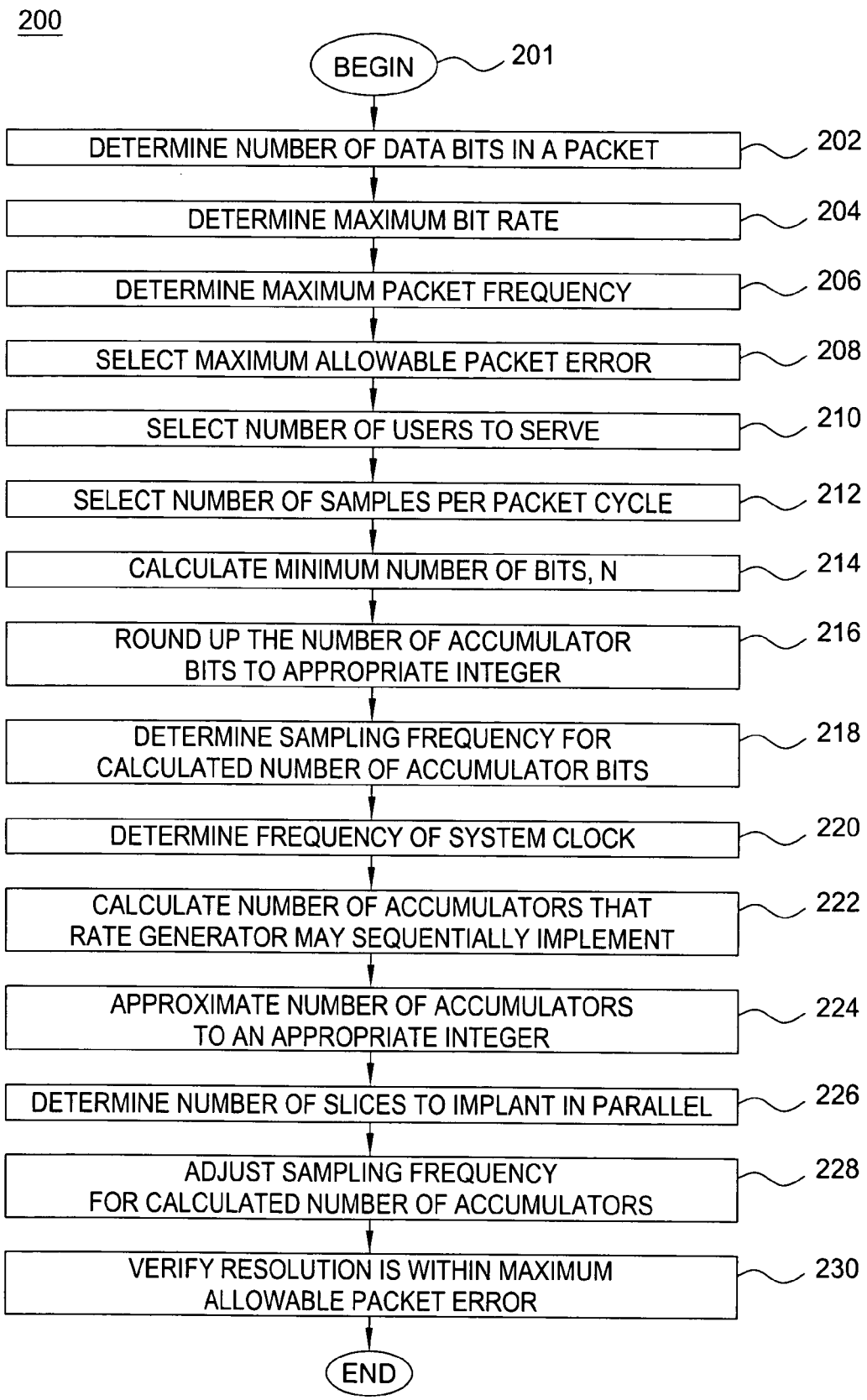
FIG. 2 depicts a flow diagram of a method for determining a rate generator that includes a plurality of the oscillators in FIG. 1.

FIG. 2 depicts a flow diagram of a method 200 for determining the operational parameters of a rate generator that includes a plurality of the virtual oscillators 100 depicted in FIG. 1. Although the following discussion will provide an illustrative example, the specific values are not intended as limiting. Other architectures are contemplated to be within the scope of the invention.

The method 200 starts at step 201 and proceeds to step 202 where the method 200 determines the number of data bits in a packet. A typical transport packet transmitted under the MPEG-2 standard comprises 188 bytes of data or (188 bytes/packet)(8 bits/byte)=1504 bits. The method 200 proceeds to step 204 for determining the maximum bit rate or maximum data rate. This value is typically 40 Mbits/sec. The method 200 proceeds to step 206 for determining the maximum packet frequency as follows:

$$\text{maximum packet frequency} = \frac{40 \; Mbits/\sec}{1504 \; bits}$$
$$\approx 26596 \; \text{packets ets}/\sec$$

At step 208, the method 200 selects an allowable packet error. This packet error is an upper limit of the frequency resolution. In this example, the allowable packet error is one packet error over a two hour interval. As the number of packets transmitted is equivalent to the packet frequency multiplied by the time period, such that $$N_{pack} = f_{pack} \times T$$

where:
$N_{pack}$=total number of packets transmitted;
$f_{pack}$=packet frequency in Hz; and
T=elapsed time to transmit packets, The number of erroneous packets transmitted is:

$$\Delta N_{pack} = \Delta f_{pack} \times T$$

where $\Delta N_{pack}$=total number of erroneous packets
$\Delta f_{pack}$=frequency of packet error in Hz
T=elapsed time to transmit packets.

In this case of one packet error per every two hour interval, the required frequency associated with the allowable packet error is:

$$\Delta f \, pack = \frac{1}{T} \text{Hz}$$
$$= \frac{1}{(2 \; \text{hours})(3600 \; \sec/\text{hour})}$$
$$= 0.000138 \, \text{Hz}$$

At step 210, the method 200 selects a number of users that the stream controller may serve using the rate generator. In this example, the rate generator architecture may produce clock signals that facilitate processing of input/output (I/O) packet requests for 256 users. Although the rate generator may theoretically include 256 of the oscillators as shown in FIG. 1, such an approach is impractical. As such, the rate generator may sequentially implement or serially implement some of these oscillators in a time-shared or Time Division Multiplexed (TDM) manner. As such, a first oscillator is formed to produce a first clock signal, then the first oscillator is torn down and replaced with a second oscillator producing a second clock signal, which is followed by a third oscillator and so on. As such, a plurality of virtual oscillators in used to create a plurality of clock signals.

At step 212, the method 200 selects a minimum number of samples per packet cycle. In this example, 10 samples per packet cycle are appropriate to minimize the clock jitter. As the maximum packet frequency is 26596 packets/second, the minimum sampling frequency to achieve at least 10 samples per packet cycle is $$26596 \frac{\text{packets}}{\sec} \times 10 \frac{\text{samples}}{\text{packet}} = 265960 \, \text{samples}/\sec$$

At step 214, the method 200 determines the number of required bits for the accumulator, N. As the resolution must be less than the frequency error, $$\text{resolution} = \frac{f_s}{2^N} \leq \Delta f_{pack}$$
$$\frac{265960}{2^N} \leq 0.000138$$
$$N \geq 30.8 \; \text{bits}$$

Therefore, to achieve a resolution less than the allowable packet error, the accumulator requires at least 30.8 bits. As the required number of accumulator bits is an integer, the method 200 proceeds to step 216 to determine an appropriate number of accumulator bits. This number of accumulator bits preferably an integer value that is a power of two. In this example, $N \geq 30.8$ bits, so N=32 is an appropriate number of accumulator bits.

After determining the required number of accumulator bits N, the method 200 determines the sampling frequency $f_s$ required for achieving a resolution less than the packet error. At this step 218, $$\frac{f_s}{2^N} \leq 0.000138$$
$$\frac{f_s}{2^{32}} \leq 0.000138$$
$$f_s \leq 592705 \, \text{Hz} \sim 0.6 \, \text{MHz}$$

At step 220, the method 200 selects an appropriate clock frequency. The clock frequency or cycle rate is limited to under 37 MHz, by the current dual port memory technology, typically implemented as configurable logic blocks (CLBs) in current high-end field programmable gate arrays (FPGAs. An appropriate clock frequency is 33 MHz, which is under the 37 MHz limit.

Note that the clock frequency selected at step 220 is much larger than the sampling frequency determined at step 218. As such, the rate generator architecture may sequentially implement many phase accumulators using current FPGA technology. The method 200 proceeds to step 222 for calculating the number of phase accumulators that the rate generator may sequentially implement:

$$\text{Number of sequential phase accumulators} = \frac{33 \, \text{MHz}}{592705 \, \text{Hz}}$$
$$= 55.7 \sim 56$$

Ideally, the number of users is an integer multiple of the number of phase accumulators that may be sequentially implemented. In this example, the VOD system 400 may serve 256 users, so the preferable number of phase accumulators to sequentially implement is a power of two. As the number of phase accumulators that the rate generator may sequentially implement, i.e. 56, is not a power of two, the method 200 proceeds to step 224 to determine a more appropriate number. As 64 is a power a two that is closest to 56, the number of sequential phase accumulators is revised from 56 to 64. Note that an increase in the number of accumulators would require a lower sampling frequency, which results in a lower resolution. These are not 64 physical accumulators, but a single accumulator that is time shared to accumulate 64 different phase values.

As the 64 sequential phase accumulators are insufficient to fully implement the 256 phase accumulators necessary to service 256 users, the method 200 proceeds to step 228 for determining the number of oscillator modules or "slices" to implement in a parallel manner. In this case, the rate generator requires four (256 divided by 64) such modules in parallel to fully implement 256 phase accumulators. As such, 4 phase accumulators are used in a time shared manner to produce 256 different clock signals.

At step 228, the method readjusts the required sampling frequency to account for the adjusted number of serially implemented phase accumulators.

$$\begin{aligned} \text{readjusted sampling frequency} &= f_s' \\ &= \frac{\text{clock frequency}}{\text{\# accumulators}} \\ &= \frac{33\,\text{MHz}}{64} \\ &= 515625\,\text{Hz} \end{aligned}$$

At step 230, the method verifies whether the resolution with this the readjusted frequency is within the frequency error.

$$\begin{aligned} \text{resolution} &= \frac{f_s}{2^N} \\ &= \frac{515625}{2^{32}} \\ &= 0.00012\,\text{Hz} \le 0.000138\,\text{Hz} \end{aligned}$$

The above method 200 may also provide a rate generator architecture to accommodate 512 users. Assuming the same maximum bit rate, number of bits per packet and packet error, as the 256 user case, the method 200 may yield two options: (1) 4 parallel slices having 128 sequential phase accumulators per slice, or (2) 8 parallel slices having 64 sequential phase accumulators per slice. The first option requires a 66 MHz clock rate, which is generally impractical due to performance limitations of the on-chip RAM used to store the phase values. As such, the second option is the currently preferred solution. However, the preferred option may change as the technology improves.

As other implementations of the above method 200 are possible depending on the latest technological advances, the scope of the invention is not limited to the previous discussed examples.

Figure 3:
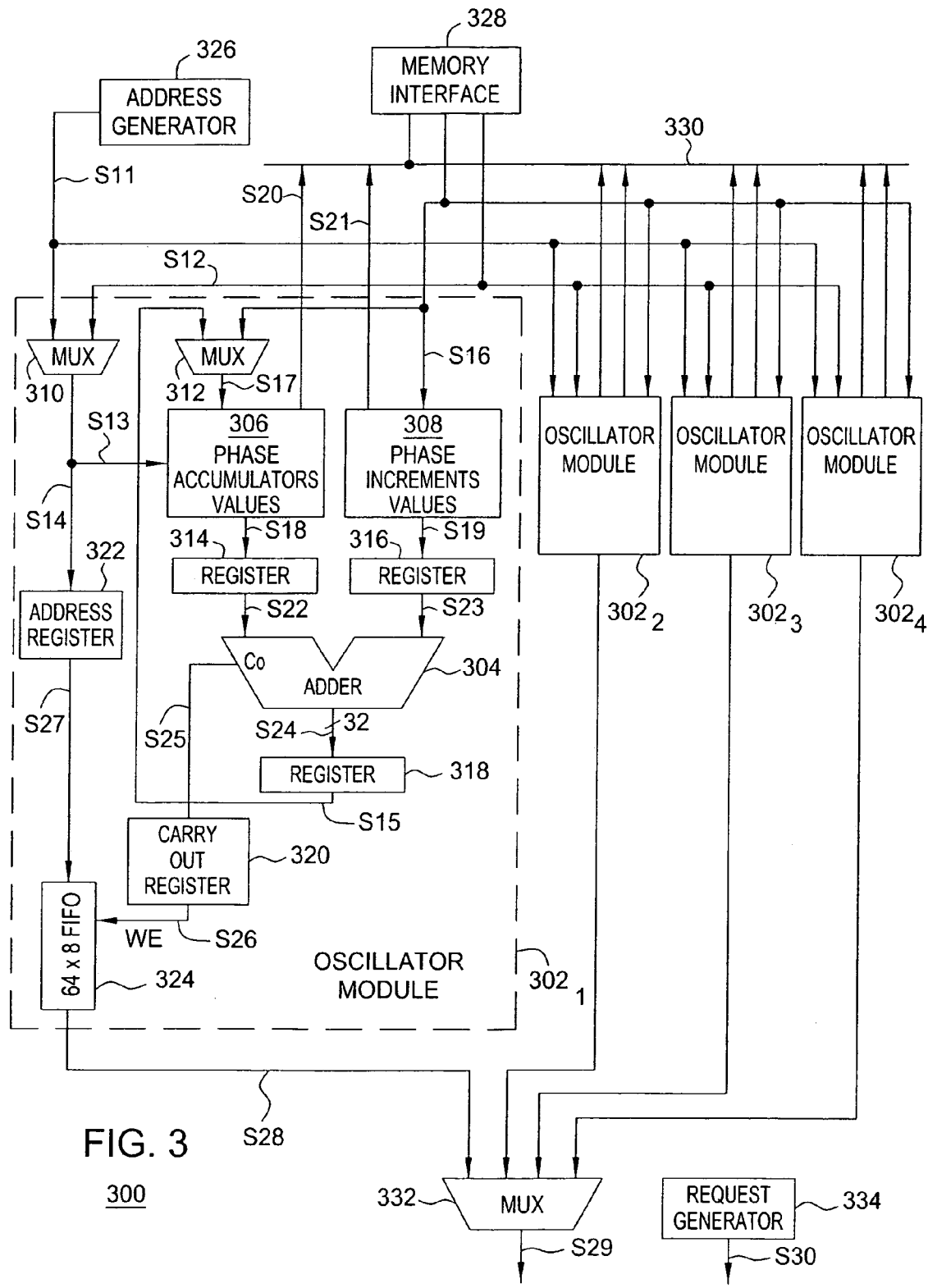
FIG. 3 depicts a block diagram of an embodiment of the rate generator as determined using the routine depicted in FIG. 2.

FIG. 3 depicts a block diagram of an embodiment of the rate generator 300 as determined using the method 200 depicted in FIG. 2. As the rate generator 300 may sequentially implement 64 of the virtual oscillators of FIG. 1, the rate generator 300 requires four parallel oscillator modules or slices $302_1$, $302_2$, $302_3$ and $302_4$ to fully implement the 256 virtual oscillators, as required to serve 256 users in a video on demand (VOD) system. The four slices $302_1$, $302_2$, $302_3$ and $302_4$ are identical, so only one general identifier 302 is required to identify any of the slices 302.

Each slice 302 generally comprises an adder 304, a phase accumulator 306 and a phase increment register 308. The slice 302 may include other components that facilitate various embodiments of the invention. These components include an address multiplexer (MUX) 310, a phase MUX 312, pipeline registers 314, 316 and 318 at the respective outputs of the phase accumulator value storage 306 (a first dual port memory), the phase increment value storage 308 (a second dual port memory) and the adder 304, a carry out register 320, an address register 322 and a first in first out (FIFO) stack 324.

The slice 302 receives signals from an address generator 326 via signal path S11 and a memory interface 328 via signal path S12. Specifically, the address MUX 310 receives a stream identifier from the address generator 326 and an address signal from the memory interface 328. The address generator 326 operates as a controller that produces the appropriate phase and phase increment values to the adder 304 to facilitate multiple frequency clock generation. In this case, the stream identifier may comprise an 8-bit binary symbol identifying one of the 256 users. The address signal identifies the location of data within a dual port memory that is a phase accumulator value that represents the accumulated phase for an oscillator producing a clock signal for that user's data. The address signal also identifies the memory location of a phase increment value within the phase increment value storage 308. The phase accumulator value storage 306 represents 64 virtual phase accumulators and the phase increment value storage 308 represents 64 virtual phase increment registers. These individual virtual phase accumulators and virtual phase increment registers are physically implemented using timely recall of the accumulator and increment values from a dual port memory within a field programmable gate array (FPGA).

The address MUX 310 selects either the stream identifier or address signal, according to control circuitry from the memory interface 328. If the address MUX 310 accepts the stream identifier, then the address MUX 310 couples the stream identifier to the address register 322 via signal path S14. If the address MUX 310 accepts the address signal, then the address MUX 310 couples the address signal to the phase accumulator value storage 306 and the phase increment value storage 308 via signal path S13.

The phase MUX 312 receives the output from the pipeline register 318 via signal path S15, which corresponds to the output from the adder 304. This signal is the output of the adder 304 from the previous cycle as determined by the sampling frequency $f_s$. In addition, the phase MUX 312 receives the phase value from the memory interface unit 328 via signal path S16. This phase value may comprise a phase increment k or some other offset number. The phase MUX 312 couples the phase accumulator value storage 306 via signal path S17.

The phase accumulator value storage 306, illustratively, represents 64 virtual phase accumulators. The 64 virtual phase accumulators may operate sequentially in a time division multiplexed (TDM) manner, as determined in the routine 200 of FIG. 2 using a 33-MHz clock frequency. Each phase accumulator stores a 32-bit value created by adding the adder output from the previous frequency cycle to the phase increment or offset value from the phase increment value storage 308. These virtual phase accumulators operate in substantially the same manner as the phase accumulator depicted in FIG. 1. The phase accumulator value storage 306 couples the sum to the pipeline register 314 via signal path S18.

The phase increment value storage 308 similarly represents 64 virtual phase increment registers. Each virtual phase increment register is a 32-bit register that receives a preselected phase increment value from the memory interface unit. The magnitude of the phase increment value is selected to produce a particular clock frequency that facilitates propagating data having a particular data rate to a user. This phase increment value is preferably between 1 and $2^{N-1}$. Each of the virtual phase registers operates with a corresponding virtual phase accumulator and the adder 304 to form each of the 64 virtual oscillators in the slice 302. The phase increment value storage 308 couples the phase increment value to the pipeline register 316 via signal path S19.

The phase accumulator value storage 306 may couple the accumulated phase value to a read bus 330 via signal path S20. Similarly, the phase increment value storage 308 may couple the phase increment value to the read bus 330 via signal path S21. As the read bus 330 is also coupled to the memory interface 328, the memory interface 328 may read the phase accumulator and phase increment values from the respective phase accumulator block and phase increment blocks 306 and 308. Although the operation of the rate generator 300 may not require the read bus 330, the memory interface unit 328 may read values from the read bus 330 during testing and system verification.

Each slice 302 comprises 64 of the oscillators of FIG. 1, the slice 302 includes pipeline registers 314 and 316 to pipeline or streamline the respective outputs from the phase accumulator value storage 306 and the phase increment value storage 308. Each pipeline register 314 may, illustratively, comprise a 32-bit register for receiving a phase value from any one of the 64 virtual phase accumulators represented by the phase accumulator value storage 306. This phase value is the sum of the adder 304 from a previous frequency cycle. Similarly, the pipeline register 316 may, illustratively, comprise a 32-bit register for receiving the phase increment value from any of the 64 virtual phase increment registers from the phase increment value storage 308. These pipeline registers 314 and 316 couple the adder 304 via respective signal paths S22 and S23.

The adder 304 receives the pipelined outputs from the phase accumulator value storage 306 via signal path S22 and the phase increment value storage 308 via signal path S23. At any given frequency cycle, the adder 304 sums the outputs from one of the 64 virtual phase accumulators and the output from a corresponding virtual phase increment register. The adder 304 couples the sum to the pipeline register 318 via signal path S24. As with the phase adder depicted in FIG. 1, the adder 304 is a modulo $2^N$ adder that rolls over and provides a carry out pulse, every time the sum passes over the value of $2^N-1$. The adder 304 couples the carry out pulse to a register via signal path S25, which stores and couples this pulse to one of the stack registers in the FIFO block 324 via signal path S26.

The pipeline register 318 operates in substantially the same manner as the other pipeline registers 314 and 316 at the respective outputs of the phase accumulator value storage 306 and the phase increment value storage 308. The pipeline register 318 couples the modulo $2^N$ adder output to the phase MUX 312 via signal path S15.

The FIFO block 324, which comprises 64 8-bit registers, receives the stream identifier or address from the register 322 via signal path S27 and the pulse from the register 320 via signal path S26. This pulse operates as a Write Enable (WE) to the FIFO block 324. Upon receiving the pulse associated with a particular user or stream identifier, the FIFO block 324 receives the stream identifier from the register 322. As the FIFO block 324 may receive multiple stream identifiers, the FIFO block processes the different stream identifiers in a FIFO queue arrangement. As such, the FIFO block 324 couples the stream identifiers in the order received to an output MUX 332 via signal path S28. In this manner, the stream identifiers are read into the FIFO at a rate that is defined by the frequency of each virtual oscillator.

The output MUX 332 may receive stream identifiers from each of the four slices 302. The rate generator 300 may include other control circuits to determine the particular slice output received by the output MUX 332. At any given instant, the output MUX 332 may transmit the stream identifier of one of the 256 users at an arbitrary (averaged) frequency $f_o$ that is a function of the sampling frequency, the number of accumulator bits and the pre-selected phase increment. The output MUX 332 transmits the sequence of stream identifiers via signal path S29.

The rate generator 300 may also include a request generator 334 that transmits a packet request via signal path S30 each time the output MUX 332 transmits the stream identifier for one of the users. The request, which may comprise a pulse or some other signal, generally represents a request of video content by any one of the users. The rate generator provides these requests at an output frequency that is dependent on the sampling frequency, the number of accumulator bits and an arbitrarily selected phase increment value.

In one embodiment of the invention, a dithering method is used to improve the frequency resolution of data transmitted to a user. This embodiment is well suited to a VOD system in which a current disk read or disk access is limited to extents or logical memory blocks sized as a multiple of whole packets. Specifically, in order to gain a finer frequency resolution, the VOD system needs to read and serve partial packets during each disk read. One approach is to dither the extents stored on disk or memory. In this dithering approach, the VOD system periodically marks the last packet in an extent as a "throw away" packet. The amount of dithering required depends on the desired output frequency or bit rate. The VOD system may use software for checking the last marked packet in the extent during disk read and decrementing the packet count in the extent if necessary. Alternatively, the VOD system may use hardware for checking each packet when fetched from memory and discarding the previously marked throw away packet.

Additionally, as the VOD system is an open-loop system, there is no flow control between the server 50 and end user equipment 70. This requires accurate packet request rates and corresponding data rates. This packet request rate depends on the sampling frequency of its associated oscillator 100, which depends on the clock frequency, i.e. 33 MHz in the previously example. As such, an extremely accurate clock or clock oscillator is required. Otherwise, the end user 70 may encounter data overflow or underflow (data starvation) problems.

As an example, suppose the data overflow or underflow (at the end user) is limited to 10 or fewer packets over a two hour period. The associated frequency error is:

$$\Delta f_{packet} = \frac{10 \text{ packets}}{7200 \text{ sec}} = 0.0138 \, \text{Hz(packets/sec)}$$

If the VOD system is transmitting video at a nominal bit rate of 3.375 Mbits/sec, the corresponding packet frequency is:

$$f_{pack} = \frac{3.375 \text{ Mbits/sec}}{1504 \text{ bits/packet}} = 2244 \, \text{Hz(packets/sec)}$$

The corresponding relative frequency error (RFE) is:

$$RFE = \frac{\Delta f_{pack}}{f_{pack}}$$

$$= \frac{0.00138 \text{ packets/sec}}{2244 \text{ packets/sec}}$$

$$= 6.15 \times 10^{-7}$$

$$\approx 0.6 \text{ ppm (parts per million)}$$

If the VOD system is transmitting HDTV video at a 40 Mbits/sec bit rate ($f_{pack}$=26596 packets/sec as previously determined), the associated RFE is:

$$RFE = \frac{\Delta f_{pack}}{f_{pack}}$$

$$= \frac{0.0138 \text{ packets/sec}}{26596 \text{ packets/sec}}$$

$$= 5.2 \times 10^{-8}$$

$$\approx 0.05 \text{ ppm}$$

The current clocks or crystal oscillators have a short term stability of less than 1 ppm. The precision decreases by approximately 1 ppm each year, so clock or crystal oscillator has a long term stability that exceeds 10 ppm after 10 years. This long term stability (10 ppm) is 200 times worse than the required precision (0.05 ppm) at the HDTV bit rate.

In order to maintain a precise clock, the clock may comprise a high stability oven controlled crystal oscillator (OCXD). When the OCXD ages and the precision or RFE drifts to an unacceptable level, the oscillator will be replaced or recalibrated if possible. Alternately, the clock may comprise a less stable oscillator that requires routine, i.e. daily, calibration.

Although various embodiments which incorporate the teaching of the invention have been shown and described in detail herein, those skilled in the art can readily devise many other varied embodiments that still incorporate these teachings.

What is claimed is:

1. A method for deriving and implementing a rate generator architecture for a selected number of users, the rate generator architecture having a plurality of physical accumulators, each physical accumulator being sequentially operated as a plurality of virtual accumulators, the method comprising:
    calculating a number of bits required for each accumulator in the rate generator architecture;
    calculating a number of virtual accumulators to sequentially implement for each of the physical accumulators in the rate generator architecture; and
    calculating a number of physical accumulators for the rate generator architecture using the calculated number of virtual accumulators and the selected number of users;
    generating a number of different clock signals corresponding to the selected number of users in a time-shared manner using the calculated number of physical accumulators.

2. The method of claim 1, wherein the method further comprises the steps of:
    providing an adder for each of the physical accumulators; and
    providing one phase increment register for each of the physical accumulators.

3. The method of claim 1, wherein calculating the number of bits comprises the steps of:
    determining a maximum sampling rate for transmitting data packets;
    determining an error frequency associated with a tolerable packet error; and
    calculating the number of bits required from the maximum sampling rate and the error frequency.

4. The method of claim 3, wherein determining the maximum sampling rate comprises the steps of:
    providing a number of bits per packet;
    providing a maximum bit rate;
    determining a maximum packet frequency from the maximum bit rate and the number of bits per packet;
    selecting a number of samples per packet; and
    determining a maximum sampling frequency from the number of samples per packet and the maximum packet frequency.

5. The method of claim 1, wherein calculating the number of virtual accumulators to sequentially implement comprises the steps of:
    adjusting the sampling frequency;
    selecting a clock frequency; and
    calculating the number of bits virtual accumulators to sequentially implement from the adjusted sampling frequency and the clock frequency.

6. The method of claim 1, wherein calculating the number of virtual accumulators to sequentially implement comprises the steps of:
    determining a sampling frequency;
    selecting a clock frequency; and
    calculating the number of virtual accumulators to sequentially implement from the sampling frequency and the clock frequency.

7. The method of claim 6, wherein determining the sampling frequency comprises the steps of:
    determining an error frequency associated with a tolerable packet error; and
    determining the sampling frequency from the error frequency associated with a tolerable packet error and the number of bits required of each accumulator.

8. The method of claim 1, wherein calculating the number of virtual accumulators to sequentially implement comprises the steps of:
    calculating an adjusted sampling frequency;
    calculating an updated error frequency from the adjusted sampling frequency and the number of bits required of each accumulator; and
    verifying that the updated error frequency is less than or equal to an error frequency associated with a tolerable packet error.

9. The method of claim 8, wherein the adjusted sampling frequency is calculated from a selected clock frequency and said number of virtual accumulators to sequentially implement.

10. The method of claim 1, wherein calculating the number of physical accumulators comprises the step of:
    calculating the number of physical accumulators by dividing the selected number of users by the calculated number of virtual accumulators to sequentially implement.

11. An apparatus for deriving a rate generator architecture having a plurality of physical accumulators, each physical accumulator for being sequentially operated as a plurality of virtual accumulators, the rate generator architecture for a selected number of users, the apparatus comprising:

means for calculating a number of bits required of each accumulator;

means for calculating a number of virtual accumulators to sequentially implement for each of the physical accumulators; and means for calculating a number of physical accumulators for the rate generator architecture using the calculated number of virtual accumulators and the selected number of users.

12. The apparatus of claim 11, further comprising:

means for providing an adder for each of the physical accumulators; and means for providing one phase increment register for each of the physical accumulators.

13. The apparatus of claim 11, wherein said means for calculating the number of bits comprises:

means for determining a maximum sampling rate for transmitting data packets;

means for determining an error frequency associated with a tolerable packet error; and means for calculating the numbers of bits required from the maximum sampling rate and the error frequency.

14. The apparatus of claim 13, wherein the means for determining the maximum sampling rate comprises:

means for providing a number of bits per packet;

means for providing a maximum bit rate;

means for determining a maximum packet frequency from the maximum bit rate and the number of bits per packet;

means for selecting a number of samples per packet; and means for determining a maximum sampling frequency from the number of samples per packet and the maximum packet frequency.

15. The apparatus of claim 11, wherein the means for calculating the number of virtual accumulators to sequentially implement comprises:

means for adjusting the sampling frequency;

means for selecting a clock frequency; and means for calculating the number of virtual accumulators to sequentially implement from the adjusted sampling frequency and the clock frequency.

16. The apparatus of claim 11, wherein the means for calculating the number of virtual accumulators to sec,uentially implement comprises:

means for determining a sampling frequency;

means for selecting a clock frequency; and means for calculating the number of virtual accumulators to sequentially implement from the sampling frequency and the clock frequency.

17. The apparatus of claim 16, wherein the means for determining the sampling frequency comprises:

means for determining an error frequency associated with a tolerable packet error; and means for determining the sampling frequency from the error frequency associated with a tolerable packet error and the number of bits required of each accumulator.

18. The apparatus of claim 11, wherein the means for calculating the number of virtual accumulators to seciuentiallv implement comprises:

means for calculating an adjusted sampling frequency;

means for calculating an updated error frequency from the adjusted sampling frequency and the number of bits required of each accumulator; and means for verifying that the updated error frequency is less than or equal to an error frequency associated with a tolerable packet error.

19. The apparatus of claim 18, wherein the adjusted sampling frequency is calculated from a selected clock frequency and the number of virtual accumulators to sequentially implement.

* * * * *